US012494268B2

(12) United States Patent
Huang et al.

(10) Patent No.: US 12,494,268 B2
(45) Date of Patent: Dec. 9, 2025

(54) ENCODING/DECODING METHOD, ENCODER/DECODER, STORAGE METHOD AND DEVICE

(71) Applicant: BGI SHENZHEN, Shenzhen (CN)

(72) Inventors: Xiaoluo Huang, Shenzhen (CN); Shihong Chen, Shenzhen (CN); Tao Lin, Shenzhen (CN); Tai Chen, Shenzhen (CN); Yue Shen, Shenzhen (CN); Xun Xu, Shenzhen (CN); Ye Yin, Shenzhen (CN); Huanming Yang, Shenzhen (CN)

(73) Assignee: BGI SHENZHEN, Guangdong (CN)

( * ) Notice: Subject to any disclaimer, the term of this patent is extended or adjusted under 35 U.S.C. 154(b) by 1317 days.

(21) Appl. No.: 16/858,295

(22) Filed: Apr. 24, 2020

(65) Prior Publication Data
US 2020/0321079 A1 Oct. 8, 2020

Related U.S. Application Data

(63) Continuation-in-part of application No. PCT/CN2018/103795, filed on Sep. 3, 2018.

(30) Foreign Application Priority Data

Oct. 25, 2017 (CN) .......................... 201711009900.2

(51) Int. Cl.
G16B 50/00 (2019.01)
G16B 30/20 (2019.01)
H03M 7/40 (2006.01)

(52) U.S. Cl.
CPC ............. *G16B 50/00* (2019.02); *G16B 30/20* (2019.02); *H03M 7/40* (2013.01)

(58) Field of Classification Search
CPC .......... G16B 50/00; G16B 30/20; H03M 7/40
See application file for complete search history.

(56) References Cited

U.S. PATENT DOCUMENTS

2004/0012511 A1 1/2004 Hagiwara
2006/0068405 A1 3/2006 Diber et al.

FOREIGN PATENT DOCUMENTS

| CN | 1463497 A | 12/2003 |
| CN | 101565746 A | 10/2009 |
| CN | 104662544 A | 5/2015 |
| CN | 104850760 A | 8/2015 |
| CN | 105022935 A | 11/2015 |
| CN | 105550570 A | 5/2016 |
| CN | 106022006 A | 10/2016 |
| CN | 106845158 A | 6/2017 |

OTHER PUBLICATIONS

Erlich et al., Mar. 2017, Science, 355, p. 950-954 and Suppl. (Year: 2017).*
Goldman et al., Towards practical, high-capacity, low-maintenance information storage in synthesized DNA, 2013, Nature, 494(7), p. 77-80. (Year: 2013).*

* cited by examiner

*Primary Examiner* — Kaitlyn L Minchella
(74) *Attorney, Agent, or Firm* — James S. Keddie; Bozicevic, Field & Francis LLP

(57) ABSTRACT

An encoding/decoding method, an encoder/decoder, and a storage method and device are provided. The encoding method comprises: determining a first bit of the encoded sequence based on a first bit of the first binary code sequence, a first bit of the second binary code sequence, and a reference symbol, the reference symbol being any one of the four different kinds of symbols; determining a current bit of the encoded sequence based on a current bit of the first binary code sequence, a current bit of the second binary code sequence, and a previous bit of the encoded sequence, the current bit of the encoded sequence being a bit other than the first bit of the encoded sequence.

7 Claims, 6 Drawing Sheets

Specification includes a Sequence Listing.

Overlooking Lushan waterfall
---Tang Dynasty. Li Bai

A sunlit incense burner produces purple smoke, and a waterfall hangs in front of the river in the distance.
It is fly straight down a stream 3,000 feet, and suspected that the Milky Way is falling into nine heavens.

SEQUENCE LISTING

```
<160> NUMBER OF SEQ ID NOS: 7

<210> SEQ ID NO 1
<211> LENGTH: 520
<212> TYPE: DNA
<213> ORGANISM: Artificial sequence
<220> FEATURE:
<223> OTHER INFORMATION: synthetic polynucleotide

<400> SEQUENCE: 1
cgcttggtga tgccttgaag gacgcgcttg tcgaggcaga cttcttaacg cttgacgagg      60
tttgctccat tgcgcttggc gataatatga acattgcgct tcacgaggga aactttttgg     120
aaaactgata ttgaacaact ccacaagtgc agcgcttgtc gatgactact tctttacgtt     180
```

```
tacactcgtc gcaacaattt gcgaacctga tgcctcgaaa ccgtgcgaac ccgatgcttc    240
gaggcctgta ttcagtggga tggtgaagag cgcacttgac ggcaagggct atagtcgtga    300
tgcgccgtgt tcgagatgga catccatgcc caacggctta aagtgtaagt agcccatccc    360
gatcacatgt agcccgccca agcgctgctg ttgtgagtgg ccgttcggct atttgcgtag    420
ccccgggtcc ccgacgcgat gtaagcttgg catccgcttg cgatgtgggc taccgaaccc    480
gatcggatgt aagacgccct tcccgaaaaa ttcttcaatc                         520

<210> SEQ ID NO 2
<211> LENGTH: 173
<212> TYPE: DNA
<213> ORGANISM: Artificial sequence
<220> FEATURE:
<223> OTHER INFORMATION: synthetic polynucleotide

<400> SEQUENCE: 2
cgcttggtga tgccttgaag gacgcgcttg tcgaggcaga cttcttaacg cttgacgagg    60
tttgctccat tgcgcttggc gataatatga acattgcgct tcacgaggga aacttttgg    120 aaaactgata ttgaacaact ccacaagtgc agcgcttgtc gatgactact tct          173

<210> SEQ ID NO 3
<211> LENGTH: 173
<212> TYPE: DNA
<213> ORGANISM: Artificial sequence
<220> FEATURE:
<223> OTHER INFORMATION: synthetic polynucleotide

<400> SEQUENCE: 3
ttacgtttac actcgtcgca acaatttgcg aacctgatgc ctcgaaaccg tgcgaacccg    60
atgcttcgag gcctgtattc agtgggatgg tgaagagcgc acttgacggc aagggctata    120
gtcgtgatgc gccgtgttcg agatggacat ccatgcccaa cggcttaaag tgt          173

<210> SEQ ID NO 4
<211> LENGTH: 174
<212> TYPE: DNA
<213> ORGANISM: Artificial sequence
<220> FEATURE:
<223> OTHER INFORMATION: synthetic polynucleotide

<400> SEQUENCE: 4
aagtagccca tcccgatcac atgtagcccg cccaagcgct gctgttgtga gtggccgttc    60
ggctatttgc gtagccccgg gtccccgacg cgatgtaagc ttggcatccg cttgcgatgt    120
gggctaccga acccgatcgg atgtaagacg cccttcccga aaaattcttc aatc          174

<210> SEQ ID NO 5
<211> LENGTH: 178
<212> TYPE: DNA
<213> ORGANISM: Artificial sequence
<220> FEATURE:
<223> OTHER INFORMATION: synthetic polynucleotide

<400> SEQUENCE: 5
agtcgcgctt ggtgatgcct tgaaggacgc gcttgtcgag gcagacttct taacgcttga    60
cgaggtttgc tccattgcgc ttggcgataa tatgaacatt gcgcttcacg agggaaactt    120
tttggaaaac tgatattgaa caactccaca agtgcagcgc ttgtcgatga ctacttct     178

<210> SEQ ID NO 6
```

```
<211> LENGTH: 178
<212> TYPE: DNA
<213> ORGANISM: Artificial sequence
<220> FEATURE:
<223> OTHER INFORMATION: synthetic polynucleotide

<400> SEQUENCE: 6
acgctttacg tttacactcg tcgcaacaat ttgcgaacct gatgcctcga aaccgtgcga        60
acccgatgct tcgaggcctg tattcagtgg gatggtgaag agcgcacttg acggcaaggg       120
ctatagtcgt gatgcgccgt gttcgagatg gacatccatg cccaacggct taaagtgt        178

<210> SEQ ID NO 7
<211> LENGTH: 179
<212> TYPE: DNA
<213> ORGANISM: Artificial sequence
<220> FEATURE:
<223> OTHER INFORMATION: synthetic polynucleotide

<400> SEQUENCE: 7
caatgaagta gcccatcccg atcacatgta gcccgcccaa gcgctgctgt tgtgagtggc        60
cgttcggcta tttgcgtagc cccgggtccc cgacgcgatg taagcttggc atccgcttgc       120
gatgtgggct accgaacccg atcggatgta agacgccctt cccgaaaaat tcttcaatc       179
```

ENCODING/DECODING METHOD, ENCODER/DECODER, STORAGE METHOD AND DEVICE

CROSS-REFERENCE TO RELATED APPLICATIONS

This application is a continuation-in-part of International Patent Application No. PCT/CN2018/103795, filed on Sep. 3, 2018, which is based on and claims priority of Chinese application for invention No. 201711009900.2, filed on Oct. 25, 2017, the disclosure of both of which are hereby incorporated into this disclosure by reference in their entireties.

INCORPORATION BY REFERENCE OF SEQUENCE LISTING PROVIDED AS A TEXT FILE

A Sequence Listing is provided herewith in a text file, CCPIT-016CIP_Seqlist.txt, created on Apr. 24, 2020 and having a size of 3,287 byes. The contents of the text file are incorporated herein by reference in its entirety.

TECHNICAL FIELD

The present disclosure relates to the technical field of data storage, and in particular, to an encoding method, a decoding method, a storage method, an encoder, a decoder, a storage device, and a non-transitory computer-readable storage medium.

BACKGROUND

With the development of modern technology, especially the internet, there is a global trend of exponential data increasing. The ever-increasing amount of data places ever higher demands on storage technology. Traditional storage technologies, such as magnetic tape and optical disk storage, are increasingly unable to meet current data needs due to limited data retention time or storage density.

In recent years, the development of DNA (Deoxyribo-Nucleic Acid) storage technology has provided a new way to solve these problems. Compared with traditional storage media, using DNA as a storage medium for information storage has a long storage term (more than several thousand years, which is more than 100 times that of existing magnetic tape and optical disc media), a high storage density (up to 109 $Gb/mm^3$., which is more than ten million times that of magnetic tape and optical disc media), and good storage security.

Related technologies include a method proposed by George Church and Goldman et al. in 2012 to transcode binary information of 0 and 1 to four kinds of deoxyribonucleotides of adenine A, cytosine C, guanine G, and thymine T, realizing the coding of each nucleotide to one binary data. Goldman et al. proposed in 2013 to convert binary data into ternary data by Huffman coding, and then convert the ternary data into a sequence of four kinds of deoxyribonucleotides according to predetermined rules.

SUMMARY

According to some embodiments of the present disclosure, an encoding method is provided, comprising: encoding a first binary code sequence and a second binary code sequence into one encoded sequence, the first binary code sequence and the second binary code sequence having the same number of bits, and the encoded sequence being composed of multiple of four different symbols, wherein the encoded sequence is obtained by the following steps: determining a first bit of the encoded sequence based on a first bit of the first binary code sequence, a first bit of the second binary code sequence, and a reference symbol, the reference symbol being any one of the four different symbols; determining a current bit of the encoded sequence based on a current bit of the first binary code sequence, a current bit of the second binary code sequence, and a previous bit of the encoded sequence, the current bit of the encoded sequence being a bit other than the first bit of the encoded sequence.

In some embodiments, a first candidate symbol group of the first bit of the encoded sequence is determined based on the first bit of the first binary code sequence according to a first mapping relationship, the first candidate symbol group comprising two of the four different symbols; a second candidate symbol group of the first bit of the encoded sequence is determined based on the first bit of the second binary code sequence and the reference symbol according to a second mapping relationship, the second candidate symbol group comprising two of the four different symbols, and the setting of the first mapping relationship and the second mapping relationship can ensure that the first candidate symbol group and the second candidate symbol group including one identical symbol; the identical symbol is determined as the first bit of the encoded sequence.

In some embodiments, a first candidate symbol group of the current bit of the encoded sequence is determined based on the current first bit of the first binary code sequence according to a predetermined first mapping relationship, the first candidate symbol group comprising two of the four different symbols; a second candidate symbol group of the current bit of the encoded sequence is determined based on the current bit of the second binary code sequence and the previous bit of the encoded sequence according to a predetermined second mapping relationship, the second candidate symbol group comprising two of the four different symbols, and the setting of the first mapping relationship and the second mapping relationship can ensure that the first candidate symbol group and the second candidate symbol group including one identical symbol; the identical symbol is determined as the current bit of the encoded sequence.

In some embodiments, the information to be encoded is transcoded into a binary code; the first binary code sequence and the second binary code sequence are extracted from the binary code.

In some embodiments, the four different symbols are four kinds of deoxyribonucleotides of adenine A, cytosine C, guanine G, and thymine T, and the encoded sequence is a nucleic acid sequence composed of the four kinds of deoxyribonucleotides.

In some embodiments, the first mapping relationship is a correspondence between the first bit or the current bit of the first binary code sequence and a symbol of the first candidate symbol group, the symbols of the first candidate symbol group comprising two of A, C, G, and T. The second mapping relationship is a correspondence between the first bit of the second binary code sequence, as well as the reference symbol, and a symbol of the second candidate symbol group, or a correspondence between the current bit and the previous bit of the second binary code sequence and a symbol of the second candidate symbol group, the symbols of the second candidate symbol group comprising two of A, C, G, and T. In addition, the setting of the first mapping relationship and the second mapping relationship can ensure that the second candidate symbol group and the first candidate symbol group include one identical symbol.

According to other embodiments of the present disclosure, a storage method is provided, comprising: splitting a nucleic acid sequence obtained according to the encoding method according to any of the above embodiments into a plurality of sequence fragments; adding an index identifier to each sequence fragment, the index identifier comprising position information of the sequence fragment; synthesizing the sequence fragments with index identifiers into nucleic acid fragments.

In some embodiments, the nucleic acid fragments are stored in a medium, which is a storage tube or a cell.

In some embodiments, the index identifier is a DNA sequence.

In some embodiments, the nucleic acid fragments are assembled before being stored in a medium.

In some embodiments, the nucleic acid fragments are ligated with a vector before being stored in a medium.

According to further embodiments of the present disclosure, a decoding method is provided, comprising: decoding the encoded sequence generated in the encoding method according to any of the above embodiments into a first binary code sequence and a second binary code sequence, wherein the first binary code sequence is obtained by the following steps: decoding two of the four different symbols in the encoded sequence to 0 and the other two of the four different symbols to 1 according to the first mapping relationship in the encoding method of any one of the above embodiments to obtain the first binary code sequence; and the second binary code sequence is obtained by the following steps: determining a first bit of the second binary code sequence based on a first bit of the encoded sequence and a reference symbol according to the second mapping relationship in the encoding method of any one of the above embodiments, the reference symbol being any one of the four different symbols; determining a current bit of the second binary code sequence based on a current bit and a previous bit of the encoded sequence according to the second mapping relationship in the encoding method of any one of the above embodiments, the current bit of the encoded sequence being a bit other than the first bit of the encoded sequence.

In some embodiments, each nucleic acid fragment synthesized in the storage method of any of the above embodiments is sequenced to obtain the respective sequence fragments; position information of each sequence fragment is obtained according to an index identifier of each sequence fragment; the sequence fragments are combined into the encoded sequence according to the position information.

In some embodiments, the four different symbols are four kinds of deoxyribonucleotides of adenine A, cytosine C, guanine G, and thymine T.

In some embodiments, the binary code sequences obtained by decoding are combined into a binary code; and the binary code is transcoded into corresponding information.

According to still other embodiments of the present disclosure, an encoder is provided, comprising: a memory configured to store a first binary code sequence and a second binary code sequence to be encoded, the first binary code sequence and the second binary code sequence having the same number of bits; a processor coupled to the memory, the processor configured to encode a first binary code sequence and a second binary code sequence into an encoded sequence, the encoded sequence being composed of four different symbols, wherein the encoded sequence is obtained by the following steps: determining a first bit of the encoded sequence based on a first bit of the first binary code sequence, a first bit of the second binary code sequence, and a reference symbol, the reference symbol being any one of the four different symbols; determining a current bit of the encoded sequence based on a current bit of the first binary code sequence, a current bit of the second binary code sequence, and a previous bit of the encoded sequence, the current bit of the encoded sequence being a bit other than the first bit of the encoded sequence.

In some embodiments, a first candidate symbol group of the first bit of the encoded sequence is determined based on a first bit of the first binary code sequence according to a first mapping relationship, the first candidate symbol group comprising two of the four different symbols; a second candidate symbol group of the first bit of the encoded sequence is determined based on the first bit of the second binary code sequence and the reference symbol according to a second mapping relationship, the second candidate symbol group comprising two of the four different symbols, and the setting of the first mapping relationship and the second mapping relationship can ensure that the first candidate symbol group and the second candidate symbol group including one identical symbol; the identical symbol is determined as the first bit of the encoded sequence.

In some embodiments, the processor is configured to determine a current bit of the encoded sequence by performing the following steps: determining a first candidate symbol group of the current bit of the encoded sequence based on a current first bit of the first binary code sequence according to a predetermined first mapping relationship, the first candidate symbol group comprising two of the four different symbols; determining a second candidate symbol group of the current bit of the encoded sequence based on a current bit of the second binary code sequence and a previous bit of the encoded sequence according to a predetermined second mapping relationship, the second candidate symbol group comprising two of the four different symbols, and the setting of the first mapping relationship and the second mapping relationship can ensure that the first candidate symbol group and the second candidate symbol group including one identical symbol; determining the identical symbol as the current bit of the encoded sequence.

In some embodiments, the processor is configured to transcode information to be encoded into a binary code, and extract the first binary code sequence and the second binary code sequence from the binary code.

In some embodiments, the four different symbols are four kinds of deoxyribonucleotides of adenine A, cytosine C, guanine G, and thymine T, and the encoded sequence is a nucleic acid sequence composed of the four kinds of deoxyribonucleotides.

In some embodiments, the first mapping relationship is a correspondence between the first bit or the current bit of the first binary code sequence and a symbol of the first candidate symbol group, the symbols of the first candidate symbol group comprising two of A, C, G, and T. The second mapping relationship is a correspondence between the first bit of the second binary code sequence, as well as the reference symbol, and the symbol of the second candidate symbol group, or a correspondence between the current bit and the previous bit of the second binary code sequence and the symbol of the second candidate symbol group, the symbols of the second candidate symbol group comprising two of A, C, G, and T. In addition, the setting of the first mapping relationship and the second mapping relationship can ensure that the second candidate symbol group and the first candidate symbol group include one identical symbol.

According to still other embodiments of the present disclosure, a storage device is provided, comprising: a sequence splitting module configured to split a nucleic acid sequence obtained in the encoding method according to any of the above embodiments into a plurality of sequence fragments; an index adding module connected to the sequence splitting module and configured to add an index identifier to each sequence fragment, the index identifier containing position information of the sequence fragment; a nucleic acid synthesis module connected to the index adding module and configured to synthesize the sequence fragments with index identifiers into nucleic acid fragments.

In some embodiments, the index identifier is a DNA sequence.

In some embodiments, the storage device further includes a nucleic acid assembly module, which is connected to the nucleic acid synthesis module and configured to assemble the nucleic acid fragments.

In some embodiments, the storage device further includes a vector ligation module, which is connected to the nucleic acid synthesis module and configured to ligate the nucleic acid fragments with a vector.

In some embodiments, the storage device further includes a media storage module, which is connected to the nucleic acid synthesis module and is configured to store the nucleic acid fragments in a medium, wherein the medium is a storage tube or a cell.

According to still other embodiments of the present disclosure, a decoder is provided, comprising: a memory configured to store an encoded sequence generated by the encoder according to any of the above embodiments; a processor coupled to the memory, the processor configured to: according to the first mapping relationship in the encoder according to any one of the above embodiments, decode two of the four different symbols in the encoded sequence to 0 and the other two of the four different symbols to 1, so as to obtain the first binary code sequence; wherein the second binary code sequence is obtained by the following steps: determining a first bit of the second binary code sequence based on a first bit of the encoded sequence and a reference symbol according to the second mapping relationship in the encoder according to any one of the above embodiments, the reference symbol being any one of the four different symbols; determining a current bit of the second binary code sequence based on a current bit and a previous bit of the encoded sequence according to the second mapping relationship, the current bit of the encoded sequence being a bit other than the first bit of the encoded sequence.

In some embodiments, each nucleic acid fragment synthesized in the storage method of any of the above embodiments is sequenced; position information of each nucleic acid fragment is obtained according to an index identifier of each nucleic acid fragment; the nucleic acid fragments are assembled into the encoded sequence according to the position sequence information.

In some embodiments, the four different symbols are four kinds of deoxyribonucleotides of adenine A, cytosine C, guanine G, and thymine T.

In some embodiments, the processor is configured to combine the binary code sequences obtained by decoding into a binary code, and transcode the binary code into corresponding information.

According to still further embodiments of the present disclosure, there is provided a computer readable storage medium having stored a computer program that, when executed by a processor, implements at least one of the following methods: the encoding method according to any of the foregoing embodiments, and the decoding method according to any of the foregoing embodiments.

In the above embodiments, with a previous bit of the encoded sequence as a constraint, the encoding method is designed to combine information of two different binary code sequences. The encoding method encodes two different binary code sequences into an encoded sequence composed of four different kinds of symbols, thereby improving storage density. In addition, the encoding method can be implemented with a plurality of joint encoding modes, in which the mapping relationship between binary codes and code symbols can be set flexibly, thereby avoiding the problem of low accuracy of subsequent decoding due to a high GC or AT repetition rate in the encoded sequence.

Other features and advantages of the present invention will become apparent from the following detailed description of exemplary embodiments of the present invention with reference to the accompanying drawings.

BRIEF DESCRIPTION OF THE DRAWINGS

The accompanying drawings, which are included to provide a further understanding of the invention and are incorporated in and constitute a part of this specification, illustrate embodiments of the invention, and together with the illustrative embodiments of the present application serve to explain the present invention, but are not limitation thereof. In the drawings:

FIG. 7a: SEQ ID NO 5, FIG. 7b: SEQ ID NO 6 and FIG. 7c: SEQ ID NO 7.

DETAILED DESCRIPTION

Figure 1:
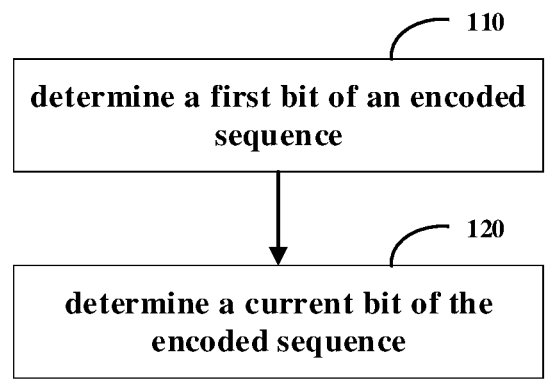
FIG. 1 shows a flowchart of an encoding method according to some embodiments of the present disclosure.

Below, a clear and complete description will be given for the technical solution of an embodiment of this invention with reference to the figures. Obviously, merely some embodiments of this invention, rather than all embodiments thereof, is given herein. The following description of at least one exemplary embodiment is in fact merely illustrative and is in no way intended as an limitation to the invention, its application or use. All other embodiments obtained by those of ordinary skill in the art based on the embodiments of the present disclosure without creative efforts shall fall within the protection scope of the present disclosure.

Unless otherwise specified, the relative arrangement, numerical expressions and numerical values of the components and steps set forth in these examples do not limit the scope of the invention. At the same time, it should be understood that, for ease of description, the dimensions of the various parts shown in the drawings are not drawn to actual proportions. Techniques, methods, and apparatus known to those of ordinary skill in the relevant art may not be discussed in detail, but where appropriate, these techniques, methods, and apparatuses should be considered as part of the specification. Of all the examples shown and discussed herein, any specific value should be construed as merely illustrative and not as a limitation. Thus, other examples of exemplary embodiments may have different values. Notice that, similar reference numerals and letters are denoted by the like in the accompanying drawings, and therefore, once an article is defined in a drawing, there is no need for further discussion in the accompanying drawings.

The inventors of the present disclosure have found the following problems existed in the above-mentioned related art: the storage density of the encoded sequences needs to be further improved, and a high GC or AT repetition rate cannot be avoided in the encoded sequences, which makes it difficult to read sequence information during the sequencing process. In view of at least one of the above problems, the present disclosure proposes a technical solution for encoding, decoding, and storage that has a large storage density and can avoid the high GC or AT repetition rate.

The encoding method of the present disclosure can encode a first binary code sequence (for example, sequence a) and a second binary code sequence (for example, sequence b) with the same number of bits into one encoded sequence. For example, information to be encoded (such as a picture, video, voice, or document) can be transcoded into a binary code, and sequences a and b can be extracted from the binary code.

FIG. 1 shows a flowchart of an encoding method according to some embodiments of the present disclosure.

As shown in FIG. 1, the encoding method may specifically include: step 110, determining a first bit of an encoded sequence; step 120, determining a current bit of the encoded sequence.

In step 110, a first bit of the encoded sequence may be determined according to a first bit of the first binary code sequence, a first bit of the second binary code sequence, and a reference symbol. For example, the encoded sequence may be composed of four different kinds of symbols, and the reference symbol may be any one of the four different kinds of symbols.

In step 120, a current bit of the encoded sequence is determined based on a current bit of the first binary code sequence, a current bit of the second binary code sequence, and a previous bit of the encoded sequence, the current bit of the encoded sequence being a bit other than the first bit of the encoded sequence.

In fact, the coding principles for the "first bit" and "current bit" of the encoded sequence are the same, except that the "first bit" does not have a so-called "previous bit" in the encoded sequence, so a reference symbol can be specified as the "previous bit" of the "first bit". For the sake of simplicity and convenience in expression, terms "current bit" and "previous bit" are used in all the embodiments of the present disclosure described below. In some embodiments, a current bit of the encoded sequence may be determined by the method shown in FIG. 2.

Figure 2:
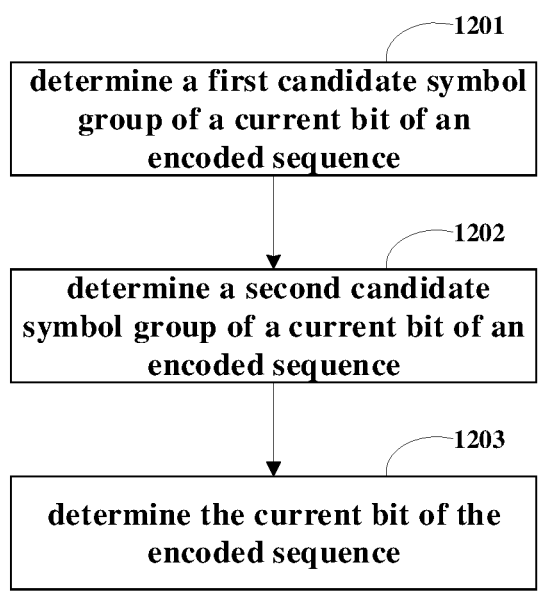
FIG. 2 shows a flowchart of an encoding method according to other embodiments of the present disclosure.

FIG. 2 shows a flowchart of an encoding method according to other embodiments of the present disclosure.

As shown in FIG. 2, the encoding method includes: step 1201, determining a first candidate symbol group of a current bit of an encoded sequence; step 1202, determining a second candidate symbol group of the current bit of the encoded sequence; step 1203, determining the current bit of the encoded sequence.

In step 1201, a first candidate symbol group of a current bit of the encoded sequence may be determined based on a current first bit of the first binary code sequence according to a predetermined first mapping relationship, the first candidate symbol group comprising two of the four different symbols. For example, mapping 0 to symbol 1 or symbol 2 and mapping 1 to symbol 3 or symbol 4 according to the first mapping relationship. In this case, a first candidate symbol group corresponding to 0 includes symbol 1 and symbol 2, and a first candidate symbol group corresponding to 1 includes symbol 3 and symbol 4.

In step 1202, a second candidate symbol group of the current bit of the encoded sequence may be determined according to a predetermined second mapping relationship based on a current bit of the second binary code sequence and a previous bit of the encoded sequence. The second candidate symbol group comprises two of four different symbols. The first candidate symbol group and the second candidate symbol group have one identical symbol. For example, the second mapping relationship may be set according to Table 1.

TABLE 1

An embodiment of the second mapping relationship

| previous bit | current bit | | | |
| | symbol 1 | symbol 2 | symbol 3 | symbol 4 |
|---|---|---|---|---|
| symbol 1 | X | Y | X | Y |
| symbol 2 | X | Y | X | Y |
| symbol 3 | X | Y | X | Y |
| symbol 4 | X | Y | X | Y |

In the above table, the current bit of the second binary code sequence may be X or Y, wherein X and Y may be one of 0 or 1, and X+Y=1 and X×Y=0 are guaranteed. For example, if the previous bit of the encoded sequence is symbol 1, the second candidate symbol group corresponding to the current bit X of the second binary code sequence includes symbol 1 and symbol 3; if the previous bit of the encoded sequence is symbol 2, the second candidate symbol group corresponding to the current bit Y of the second binary code sequence includes symbol 2 and symbol 4. The setting of the first mapping relationship and the second mapping relationship can ensure that the first candidate symbol group and the second candidate symbol group include one identical symbol.

In step 1203, the identical symbol in the two symbol groups may be determined as the current bit of the encoded sequence. For example, X=0, Y=1, if the current bit of the second binary code sequence is X=0, the first candidate symbol group includes symbol 1 and symbol 2, and if the previous bit of the encoded sequence is symbol 1, according to the mapping relationship in the above table, the second candidate symbol group includes symbol 1 and symbol 3. In this case, the intersection of the two symbol groups is symbol 1, and it can be determined that the current bit of the encoded sequence is symbol 1.

In order to explain the above encoding method more clearly, an embodiment in which two different binary code sequences are encoded into a single encoded sequence will be specifically given below with reference to FIG. 3.

Figure 3:
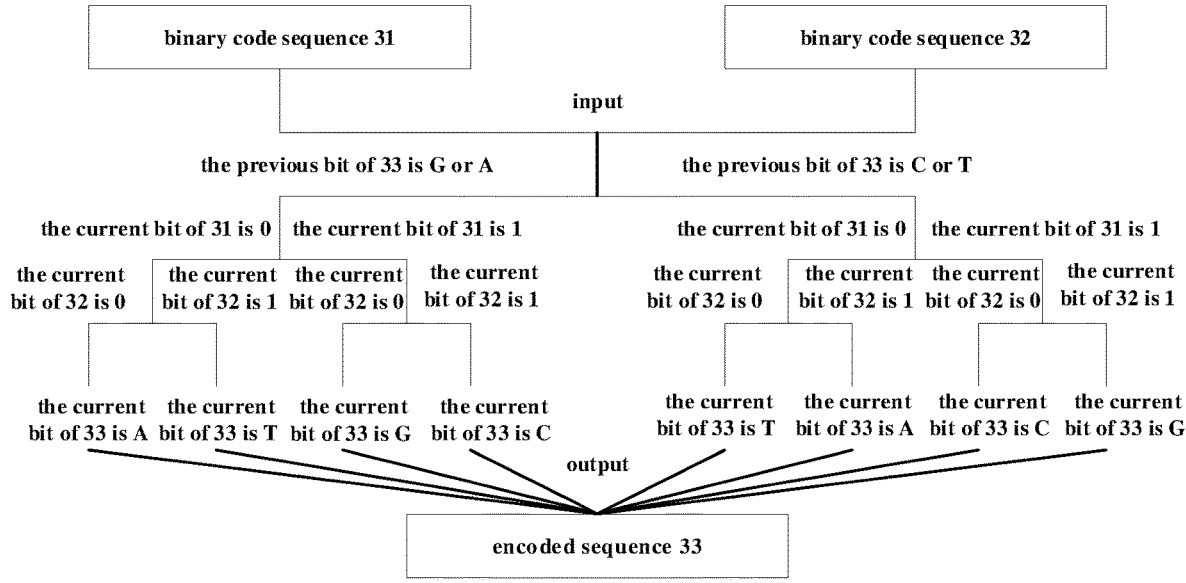
FIG. 3 shows a flowchart of an encoding method according to further embodiments of the present disclosure.

FIG. 3 shows a flowchart of an encoding method according to further embodiments of the present disclosure.

As shown in FIG. 3, a binary code sequence 31 is 0011001111001100110011001100110011, and a binary code sequence 32 is 010101111101111111111111111111. The four kinds of symbols in the encoding method in the embodiment of FIG. 1 and FIG. 2 may be adenine A, cytosine C, guanine G, and thymine T, and the encoded sequence 33 is a sequence including four kinds of deoxyribonucleotides of A, C, G, and T.

The first mapping relationship may be:

$A=0$ $T=0$ $G=1$ $C=1$

That is, the first candidate symbol group of the current bit of the encoded sequence 33 corresponding to the current bit 0 in the binary code sequence 31 includes A and T, and the first candidate symbol group of the current bit of the encoded sequence 33 corresponding to the current bit 1 in the binary code sequence 31 includes G and C.

The second mapping relationship may be:

TABLE 2

Another embodiment of the second mapping relationship

| | current bit | | | |
|---|---|---|---|---|
| previous bit | A | T | G | C |
| A | 0 | 1 | 0 | 1 |
| T | 1 | 0 | 1 | 0 |
| G | 0 | 1 | 0 | 1 |
| C | 1 | 0 | 1 | 0 |

In the above table, when the previous bit of the encoded sequence 33 is A, the second candidate symbol group of the current bit of the encoded sequence 33 corresponding to the current bit 0 in the binary code sequence 32 includes A and G. In other situations, the second mapping relationship may also be established according to the correspondence in the above table.

According to the above first and second mapping relationships, all the "current bits" of the encoded sequence 33 can be determined through the following steps.

If the previous bit of the encoded sequence 33 is G or A, the current bit if the binary code sequence 31 is 0, and the current bit of the binary code sequence 32 is 0, the current bit of the encoded sequence 33 will be A. If the previous bit of the encoded sequence 33 is G or A, the current bit of the binary code sequence 31 is 0, and the current bit of the binary code sequence 32 is 1, the current bit of the encoded sequence 33 will be T. If the previous bit of the encoded sequence 33 is G or A, the current bit of the binary code sequence 31 is 1, and the current bit of the binary code sequence 32 is 0, the current bit of the encoded sequence 33 will be G. If the previous bit of the encoded sequence 33 is G or A, the current bit of the binary code sequence 31 is 1, and the current bit of the binary code sequence 32 is 1, the current bit of the encoded sequence 33 will be C.

If the previous bit of the encoded sequence 33 is C or T, the current bit of the binary code sequence 31 is 0, and the current bit of the binary code sequence 32 is 0, the current bit of the encoded sequence 33 will be T. If the previous bit of the encoded sequence 33 is C or T, the current bit of the binary code sequence 31 is 0, and the current bit of the binary code sequence 32 is 1, the current bit of the encoded sequence 33 will be A. If the previous bit of the encoded sequence 33 is C or T, the current bit of the binary code sequence 31 is 1, and the current bit of the binary code sequence 32 is 0, the current bit of the encoded sequence 33 will be C. If the previous bit of the encoded sequence 33 is C or T, the current bit of the binary code sequence 31 is 1, and the current bit of the binary code sequence 32 is 1, the current bit of the encoded sequence 33 will be G. Through encoding bit by bit according to the above method, an encoded sequence 33 ATCGATGCGC-TACGTACGTACGTACG can be obtained.

In the case of the encoding of the first bit of the encoded sequence 33, since no "previous bit" exists, a reference bit can be set as the "previous bit" of the first bit. For example, any one of A, C, G, or T can be provided in front of the encoded sequence 33 as a reference bit, and the reference bit can be used as the "previous bit" in the above encoding method. The remaining steps are the same and will not be repeated here.

The above encoding process takes into account both the codes in the binary code sequences 31 and 32, to determine the content in the final encoded sequence 33. That is, information of two different binary code sequences can be fused into one encoded sequence, thereby improving the code storage density.

Note that, a plurality of combinations of the first mapping relationship and the second mapping relationship can be specified, as long as it is ensured that the first and second candidate symbol groups of the current bit in the encoded sequence have an identical symbol. For example, the first mapping relationship may be:

$A=0$ $G=0$ $T=1$ $C=1$

The second mapping relationship may be:

TABLE 3

A further embodiment of the second mapping relationship

| | current bit | | | |
|---|---|---|---|---|
| previous bit | A | T | G | C |
| A | 0 | 1 | 1 | 0 |
| T | 0 | 1 | 0 | 1 |
| G | 0 | 1 | 0 | 1 |
| C | 0 | 1 | 1 | 0 |

The first and second mapping relationships shown above can ensure that an identical symbol exists in the first candidate symbol group and the second candidate symbol group, that is, two different binary code sequences can be encoded into a single encoded sequence.

That is, there may be a plurality of joint setting modes of the first and second mapping relationships, which can be specifically set through the following steps.

The first mapping relationship may be set as:

symbol 1=0 symbol 2=0 symbol 3=1 symbol 4=1

The second mapping relationship may be set as shown in Table 4.

TABLE 4 setting of the second mapping relationship

| previous bit | current bit | | | |
|---|---|---|---|---|
| | symbol 1 | symbol 2 | symbol 3 | symbol 4 |
| symbol 1 | $X_1$ | $Y_1$ | $X_2$ | $Y_2$ |
| symbol 2 | $X_3$ | $Y_3$ | $X_4$ | $Y_4$ |
| symbol 3 | $X_5$ | $Y_5$ | $X_6$ | $Y_6$ |
| symbol 4 | $X_7$ | $Y_7$ | $X_8$ | $Y_8$ |

Symbol 1, symbol 2, symbol 3, and symbol 4 may correspond to one of the bases A, T, G, and C, respectively.

Symbol 1 and symbol 2 in the first mapping relationship have no order relationship, and correspond to two bases respectively. Symbol 3 and symbol 4 correspond to the other two bases. Thus, the first mapping relationship has $C_4^2=6$ setting modes.

The second mapping relationship needs to satisfy a condition of $X_n+Y_n=1$, $X_n \times Y_n=0$, and $n \in \{1,2,3,4,5,6,7,8\}$. For each setting mode of the first mapping relationship, $X_n$ and $Y_n$ in the second mapping relationship have two possible combinations, that is, $X_n=0$, $Y_n=1$, or $X_n=1$, $Y_n=0$. Since n has 8 possibilities, the second mapping relationship has $2^8$ setting modes.

Therefore, there are 6×28=1536 joint setting modes of the first mapping relationship and the second mapping relationship.

Therefore, the present disclosure can transform a variety of mapping relationships to encode binary code sequences, thereby avoiding a high GC or AT repetition rate in the encoded sequence to the greatest extent.

In the above embodiment, with a previous bit in the encoded sequence as a constraint, the encoding method is designed to combine information of two different binary code sequences. The encoding method encodes two different binary code sequences into an encoded sequence composed of four different symbols, thereby improving storage density. In addition, the encoding method can be implemented with a plurality of joint encoding modes, in which the mapping relationship between binary codes and code symbols can be set flexibly, thereby avoiding the problem of low accuracy of subsequent decoding due to a high GC or AT repetition rate in the encoded sequence.

According to some of the above embodiments, binary code sequences can be encoded as a nucleic acid sequence composed of A, C, G, T. In this way, the nucleic acid sequence can be further synthesized into nucleic acid fragments and stored according to the storage method in FIG. 4.

Figure 4:
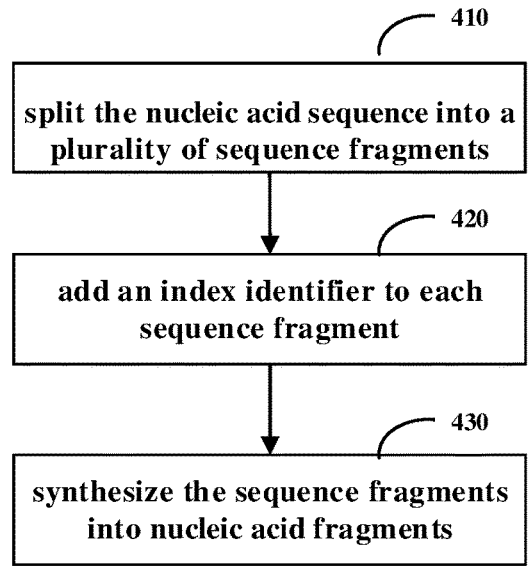
FIG. 4 shows a flowchart of a storage method according to some embodiments of the present disclosure.

FIG. 4 shows a flowchart of a storage method according to some embodiments of the present disclosure.

As shown in FIG. 4, the storage method includes steps 410-430.

In step 410, the nucleic acid sequence obtained in the encoding method of some embodiments described above is split into a plurality of sequence fragments. These sequence fragments are relatively short in length to facilitate synthesis.

In step 420, an index identifier is added to each sequence fragment, wherein the index identifier includes position information of the sequence fragment for synthesis. The index identifier may be a DNA sequence.

In step 430, the sequence fragments are synthesized into nucleic acid fragments. The nucleic acid fragments can be directly assembled into a larger fragment, or the nucleic acid fragments can be ligated with a vector. The nucleic acid fragments can be stored in a medium, which can be a storage tube or a cell, for example, the nucleic acid fragments can be stored in an isolated chemical medium or can be stored in a living cell.

In the above embodiments, the nucleic acid fragments corresponding nucleic acid sequences are synthesized and stored, thereby improving the data retention time or storage density.

Figures 5, 6:
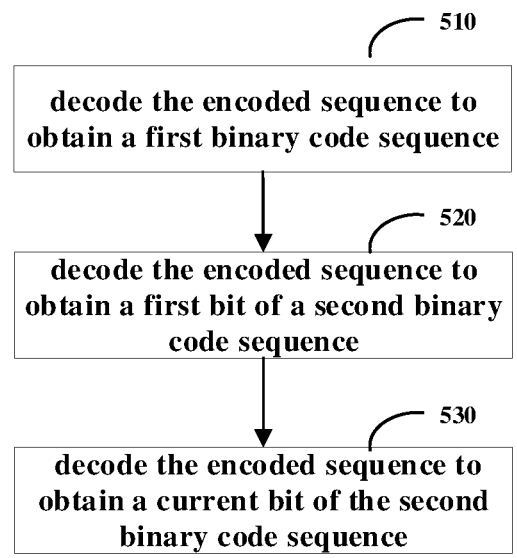
FIG. 5 shows a flowchart of a decoding method according to some embodiments of the present disclosure.
FIG. 6 shows a schematic diagram of information to be encoded according to some embodiments of the present disclosure.

After the binary code sequences have been encoded and stored according to some of the above embodiments, according to a decoding method corresponding to the encoding method, the encoded sequence can be decoded through the steps in FIG. 5.

FIG. 5 shows a flowchart of a decoding method according to some embodiments of the present disclosure.

As shown in FIG. 5, the decoding method can decode an encoded sequence generated according to the above encoding method into a first binary code sequence and a second binary code sequence, and specifically includes steps 510-530.

In step 510, two of the four different symbols included in the encoded sequence may be decoded to 0 and the other two of the four different kinds of symbols may be decoded to 1 according to the first mapping relationship in the above encoding method to obtain a first binary code sequence.

In step 520, a first bit of a second binary code sequence may be determined based on a first bit of the encoded sequence and a reference symbol according to the second mapping relationship in the above encoding method, the reference symbol being any of four different kinds of symbols.

In step 530, a current bit of the second binary code sequence is determined based on a current bit and a previous bit of the encoded sequence according to the second mapping relationship, the current bit of the encoded sequence being a bit other than the first bit of the encoded sequence.

Then, the binary code sequences obtained by decoding can be combined into a binary code, which is then transcoded into corresponding information, such as an audio, video, or document. This step can be implemented by an operating system's built-in program or a program specially written to convert binary code into corresponding information.

In some embodiments, each nucleic acid fragment synthesized according to the above storage method can be sequenced to obtain the sequence fragments. The sequencing method can be Sanger sequencing or high-throughput sequencing. Then, position information of each sequence fragment is obtained according to the index identifier of each sequence fragment, that is, the sequence fragment is sorted. Finally, according to the position information, the sequence fragments are combined into an encoded sequence. In this case, the encoded sequence is a sequence including four kinds of deoxyribonucleotides of A, C, G, and T.

In other embodiments, the encoded sequence is obtained by the encoding method shown in FIG. 3. That is, the encoded sequence 33 is ATCGATGCGC-TACGTACGTACGTACG, the first mapping relationship adopted is A=0, T=0, G=1, C=1, and the second mapping relationship is shown in Table 2.

According to the first mapping relationship, the encoded sequence 33 can be decoded into a binary code sequence 31: 0011001111001100110011001100110011. According to the second mapping relationship, the encoded sequence 33 can be decoded into a binary code sequence 32: 010101111101111111111111111111. Specifically, the binary code sequence 32 can be obtained by decoding in the following steps.

If the previous bit of the encoded sequence 33 is A or G and the current bit is A or G, it is decoded as 0. If the previous bit of the encoded sequence 33 is A or G and the current bit is T or C, it is decoded as 1. If the previous bit of the encoded sequence 33 is T or C and the current bit is A or G, it is decoded as 1. If the previous bit of the encoded sequence 33 is T or C and the current bit is T or C, it is decoded as 0.

When decoding the first bit of the encoded sequence 33, a reference bit set in advance during encoding may be used as the "previous bit" of the first bit, and the remaining steps are the same.

In the above embodiment, according to different mapping relationships, two different binary code sequences can be decoded from an encoded sequence composed of four different kinds of symbols, thereby improving the encoding storage density.

Taking document information as an example, some embodiments will be given below to specifically describe the process of information encoding, storing, and decoding according to the technical solution of the present disclosure.

In the encoding process, first, the information to be encoded is transcoded into a binary code.

For example, FIG. 6 shows a schematic diagram of information to be encoded according to some embodiments of the present disclosure. The English text in FIG. 6 is the translation of the Chinese text to be encoded. The Chinese text is encoded to get a corresponding binary code as follows:

"1110011010011100100110111110010110111010100100
0011100101
1011000110110001111001111000000010010001111001
011011100010000011
0000101000001001001011010010110111100101100101
001001000011000010
1011011100100000111001101001110110001110111001
111001100110111101
0000101011001101001011110100101111001111000010
11010011111101001
1010011010011001111001111000001010001001111001
01111001010010011111
1110011110110100101010111110011110000011100111
1111110111110111100
1000110011100111100110010111100110011100110011
100100010111110011110
1000000010010001111001011011100010000011111000
0110100011001000010
1110010110001001100011011110010110110111100011
011110001110000000
1000001000001010110100110100011100111011100101
10101101011000000110
1110011110011011110100110010010110001000100101
11110010010111000
1000100111100101100011011000001111100101101111
000010111010111011110

101111001000110011100111100101101001000111100
110100110001010111111
1101001100100111101101101110011010110010101100
11110010010000000
1011110111100100101110011001110111100101101000
1001010100111100011
1000000010000010000010101010".

Then, the binary code is divided into two parts a and b.

The sequence a is:

"1110011010011100100110111110010110111010100100
0001110010110110001111001111000000100100011110
0101101110001000000011001110011101001110110001
111011100
0000101011001101001011110100101111001111000
01011010011111101001
1010011010011001111001111000001010001001111000
01111001010010011111
1110011110110100101010111110011110000011100111
1111110111110111100
100011001110011110011010111100111001111001
110010001011111001011
11001000101111100111 1000000010010001".

The sequence b is:

"1110010110111000100000111110011010001100100000
1011100101
10001001100011011110010110110111100111011111
00111000000010000010
000001010111010011010001110011110111001101101
10110100000011110011
100110111011010011100100101111000010001011110
01001011100010001001
111001011000110110000011111001011011000010
1111010111110111100
100011001110011110010110100100011110011010001
1000101011111101001
1001001110110110111001101011001010110011110
1000100010001011110
1110010010111001100111011111001001101001010010
10011111000111000000 1000001000001010".

Finally, sequences a and b are encoded together into a single encoded sequence using a first mapping relationship and s second mapping relationship.

The first mapping relationship is set to be:

$A=0$ $T=0$ $C=1$ $G=1$

The second mapping relationship is set to be:

TABLE 5

Another embodiment of the second mapping relationship

| previous bit | current bit | | | |
|---|---|---|---|---|
| | A | T | G | C |
| A | 0 | 1 | 0 | 1 |
| T | 1 | 0 | 1 | 0 |
| G | 1 | 0 | 1 | 0 |
| C | 0 | 1 | 0 | 1 |

The encoded sequence (SEQ ID NO: 1) obtained after joint-encoding is:

"CGCTTGGTGATGCCTTGAAGGACGCGCTTGTCGAGGCAGACTTCTT

AACGCTTGACGAGGTTTGCTCCATTGCGCTTGGCGATAATATGAACA

TTGCGCTTCACGAGGGAAACTTTTTGGAAAACTGATATTGAACAACT

CCACAAGTGCAGCGCTTGTCGATGACTACTTCTTTACGTTTACACTC

GTCGCAACAATTTGCGAACCTGATGCCTCGAAACCGTGCGAACCCGA

TGCTTCGAGGCCTGTATTCAGTGGGATGGTGAAGAGCGCACTTGACG

GCAAGGGCTATAGTCGTGATGCGCCGTGTTCGAGATGGACATCCATG

CCCAACGGCTTAAAGTGTAAGTAGCCCATCCCGATCACATGTAGCCC

GCCCAAGCGCTGCTGTTGTGAGTGGCCGTTCGGCTATTTGCGTAGCC

CCGGGTCCCCGACGCGATGTAAGCTTGGCATCCGCTTGCGATGTGGG

CTACCGAACCCGATCGGATGTAAGACGCCCTTCCCGAAAAATTCTTC

AATC".

It can be seen that the above encoded sequence is a nucleic acid sequence containing four kinds of deoxyribonucleotides. The nucleic acid sequence is synthesized into nucleic acid fragments and stored according to the storage method of the present disclosure.

In the storage process, first, the above nucleic acid sequence is split into three sequence fragments with a length of 173 bp.

The three sequence fragments are shown in Table 6.

TABLE 6

Sequence fragments

| Sequence number | sequence fragment |
| --- | --- |
| 1 (SEQ ID NO: 2) | CGCTTGGTGATGCCTTGAAGGACGCGCTT GTCGAGGCAGACTTCTTAACGCTTGACGA GGTTTGCTCCATTGCGCTTGGCGATAATA TGAACATTGCGCTTCACGAGGGAAACTTT TTGGAAAACTGATATTGAACAACTCCACA AGTGCAGCGCTTGTCGATGACTACTTCT |
| 2 (SEQ ID NO: 3) | TTACGTTTACACTCGTCGCAACAATTTGC GAACCTGATGCCTCGAAACCGTGCGAACC CGATGCTTCGAGGCCTGTATTCAGTGGGA TGGTGAAGAGCGCACTTGACGGCAAGGGC TATAGTCGTGATGCGCCGTGTTCGAGATG GACATCCATGCCCAACGGCTTAAAGTGT |
| 3 (SEQ ID NO: 4) | AAGTAGCCCATCCCGATCACATGTAGCCC GCCCAAGCGCTGCTGTTGTGAGTGGCCGT TCGGCTATTTGCGTAGCCCCGGGTCCCCG ACGCGATGTAAGCTTGGCATCCGCTTGCG ATGTGGGCTACCGAACCCGATCGGATGTA AGACGCCCTTCCCGAAAAATTCTTCAATC |

Then, a 5 bp index identifier is added to each short sequence fragment. The index identifiers of the three sequence fragments are: AGTCG, ACGCT and CAATG.

The sequence fragments with index identifiers are shown in Table 7, wherein the index identifiers are underlined.

TABLE 7

Sequence fragments after adding index identifiers

| Sequence number | sequence fragment |
| --- | --- |
| 1 (SEQ ID NO: 5) | AGTCGCGCTTGGTGATGCCTTGAAGGACG CGCTTGTCGAGGCAGACTTCTTAACGCTT GACGAGGTTTGCTCCATTGCGCTTGGCGA TAATATGAACATTGCGCTTCACGAGGGAA ACTTTTTGGAAAACTGATATTGAACAACT CCACAAGTGCAGCGCTTGTCGATGACTAC TTCT |
| 2 (SEQ ID NO: 6) | ACGCTTTACGTTTACACTCGTCGCAACAA TTTGCGAACCTGATGCCTCGAAACCGTGC GAACCCGATGCTTCGAGGCCTGTATTCAG TGGGATGGTGAAGAGCGCACTTGACGGCA AGGGCTATAGTCGTGATGCGCCGTGTTCG AGATGGACATCCATGCCCAACGGCTTAAA GTGT |
| 3 (SEQ ID NO: 7) | CAATGAAGTAGCCCATCCCGATCACATGT AGCCCGCCCAAGCGCTGCTGTTGTGAGTG GCCGTTCGGCTATTTGCGTAGCCCCGGGT CCCCGACGCGATGTAAGCTTGGCATCCGC TTGCGATGTGGGCTACCGAACCCGATCGG ATGTAAGACGCCCTTCCCGAAAAATTCTT CAATC |

Finally, the three sequence fragments in Table 7 were synthesized into nucleic acid fragments and cloned into a pUC57 vector. The nucleic acid fragments ligated to a vector are placed in a centrifuge tube and stored at −20° C.

After storage, if necessary, the nucleic acid fragments stored in the centrifuge tube can be decoded to obtain the corresponding document information.

In the decoding process, first, Sanger sequencing can be performed on the stored nucleic acid fragments to obtain sequence fragments 1-3.

Figure 7A:
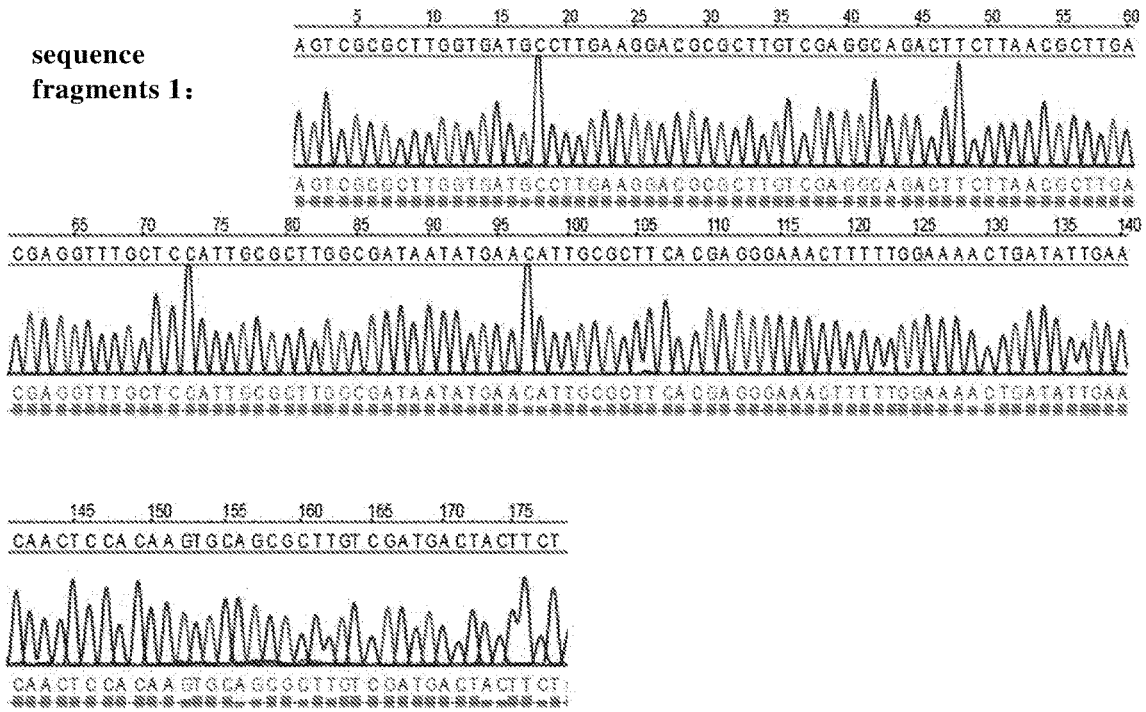
FIGS. 7a-7c show sequencing peaks for sequence fragments 1-3.
Figure 7B:
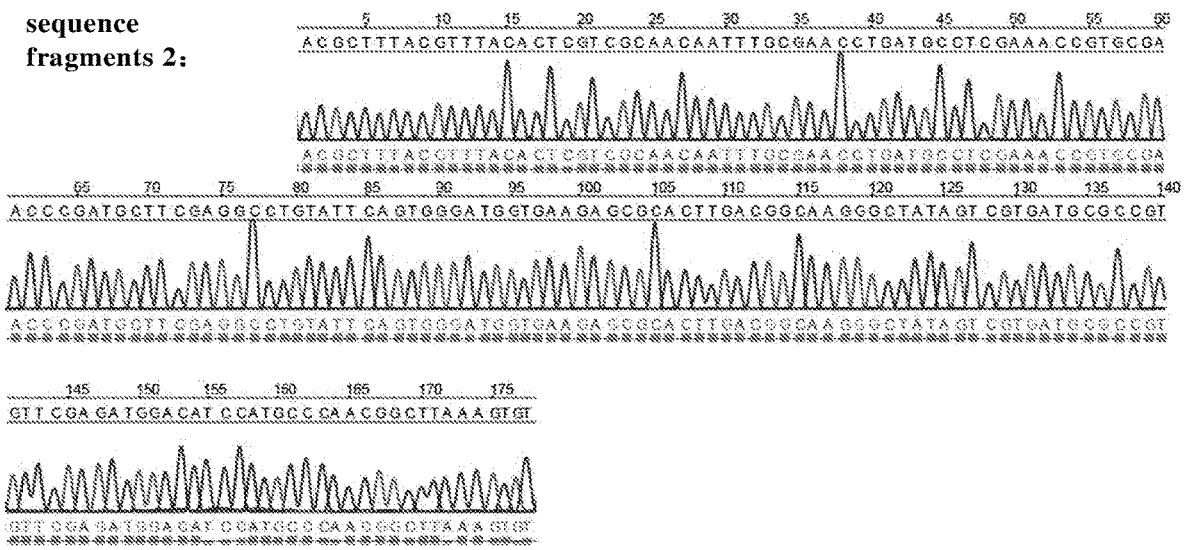
Figure 7C:
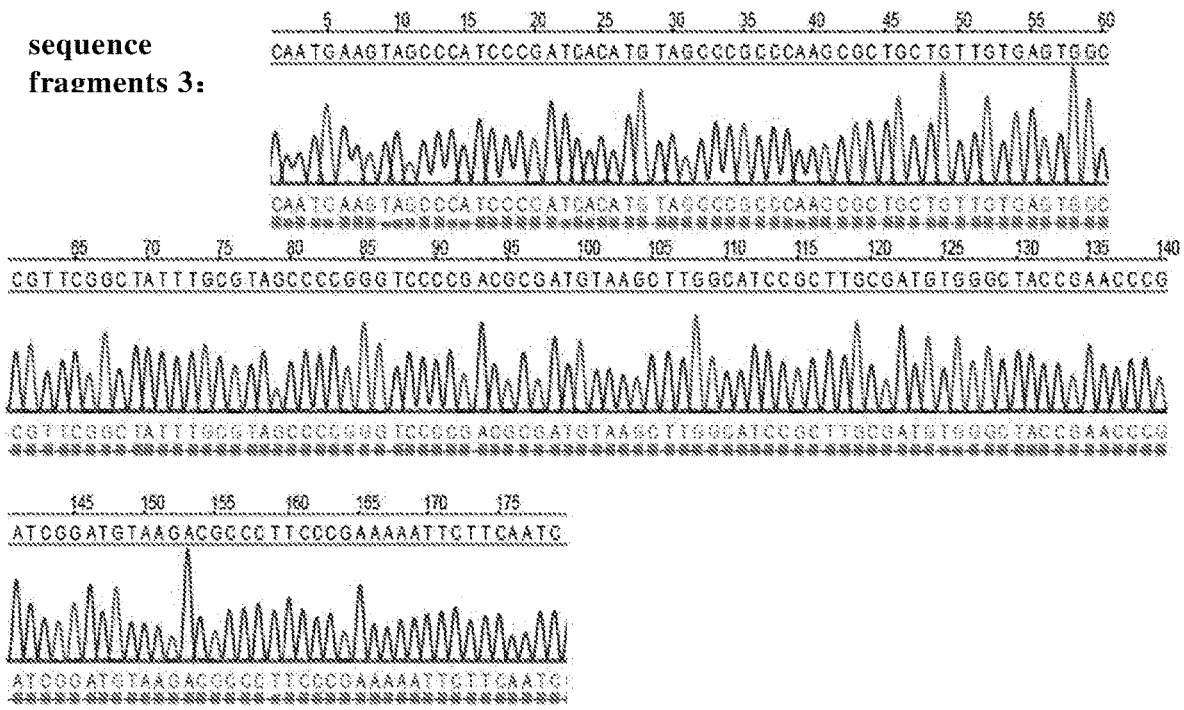

FIGS. 7a-7c show sequencing peaks for sequence fragments 1-3.

As shown in FIGS. 7a-7c, the sequence fragments obtained after sequencing are consistent with that shown in Table 7.

Then, the order of each sequence segment is obtained according to the index identifier, and the sequence segments are sorted and assembled into a complete encoded sequence.

The encoded sequence (SEQ ID NO: 1) obtained after assembly is:

"CGCTTGGTGATGCCTTGAAGGACGCGCTTGTCGAGGCAGACTTCTT

AACGCTTGACGAGGTTTGCTCCATTGCGCTTGGCGATAATATGAACA

TTGCGCTTCACGAGGGAAACTTTTTGGAAAACTGATATTGAACAACT

CCACAAGTGCAGCGCTTGTCGATGACTACTTCTTTACGTTTACACTC

GTCGCAACAATTTGCGAACCTGATGCCTCGAAACCGTGCGAACCCGA

TGCTTCGAGGCCTGTATTCAGTGGGATGGTGAAGAGCGCACTTGACG

GCAAGGGCTATAGTCGTGATGCGCCGTGTTCGAGATGGACATCCATG

CCCAACGGCTTAAAGTGTAAGTAGCCCATCCCGATCACATGTAGCCC

GCCCAAGCGCTGCTGTTGTGAGTGGCCGTTCGGCTATTTGCGTAGCC

-continued

CCGGGTCCCCGACGCGATGTAAGCTTGGCATCCGCTTGCGATGTGGG

CTACCGAACCCGATCGGATGTAAGACGCCCTTCCCGAAAAATTCTTC

AATC".

Then, the above encoded sequence is decoded according to the first mapping relationship to obtain sequence a:
"111001101001110010011011111001011011101010010
00011100101
101100011011000111100111100000001001000111100
101101110001000011
000010100000100100101101001011011110010110010
1001001000011000010
101101110010000011100110100111011000111011100
1111001100110111101
000010101110011010010111101001011100111100001
011010011111101001
101001101001100111100111100000101000100111100 20
1111001010010011111
111001111011010010101011110011110000011100111
1111110111110111100
100011001110011110011100101111001110011110011
1001000101111100111 1000000010010001".
The encoded sequence is decoded according to the second mapping relationship to obtain sequence b:
"111001011011100010000011111001101000110010000
1011100101
100010011000110111100101101101111001110111100 30
0111000000010000010
000010101110100110100011100111101110011010110
101100000111100111
100110111011010011100100101110001000101111100
1001011100010001001 35
111001011000110110000011111001011011000010111
10101110111110111100
100011001110011110010110100100011110011010011
10001010111111101001
100100111011011011100110101100101011001111101 40
10001001000010111101
111001001011100110011101111100101101001001010
100111100011100000001 1000001000001010".
Finally, the sequences a and b can be converted into the Chinese text corresponding to the English text in FIG. 6 by 45 using software.

In the above embodiment, document information is stored in the nucleic acid fragments through the technical solution of the present disclosure, and the document information stored in the nucleic acid e fragments can be completely decoded. The resulting encoded sequence, excluding the index identifier, has a binary storage density of 2 bits/nt for the document information, which is significantly higher than the storage methods in the related art. Moreover, the occurrences of continuous GC and continuous AT in the encoded sequence are uniform, and there is no excessively long continuous sequence of single repetitive base, that is, high GC or AT repetitions can be avoided, which makes subsequent decoding of sequence fragments more accurate.

Figure 8:
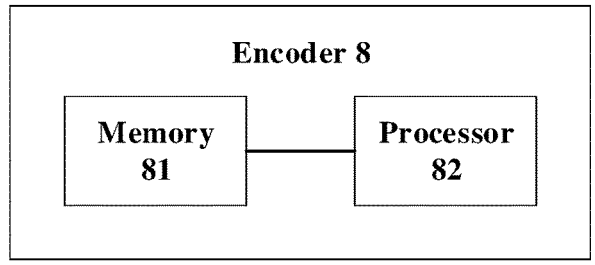
FIG. 8 shows a block diagram of an encoder of some embodiments of the present disclosure.

FIG. 8 shows a block diagram of an encoder of some embodiments of the present disclosure.

As shown in FIG. 8, the encoder 8 includes a memory 81 and a processor 82.

The memory 81 stores a first binary code sequence and a second binary code sequence to be encoded, the first binary code sequence having the same number of bits as the second binary code sequence.

The processor 82 is coupled to the memory and configured to encode the first binary code sequence and the second binary code sequence into an encoded sequence. For example, the processor 82 transcodes information to be encoded into a binary code, and extracts the first binary code sequence and the second binary code sequence from the binary code. The encoded sequence can be composed of four different symbols, for example, four kinds of deoxyribonucleotides of A, C, G, and T, and the encoded sequence is a nucleic acid sequence containing four kinds of deoxyribonucleotides. The encoded sequence can be obtained by the following steps.

A first bit of the encoded sequence is determined based on a first bit of the first binary code sequence, a first bit of the second binary code sequence, and a reference symbol, the reference symbol being any one of the four different symbols. For example, a first candidate symbol group of the first bit of the encoded sequence is determined based on the first bit of the first binary code sequence according to a predetermined first mapping relationship, the first candidate symbol group comprising two of the four different symbols. A second candidate symbol group of the first bit of the encoded sequence is determined based on the first bit of the second binary code sequence and the reference symbol according to a second predetermined mapping relationship, the second candidate symbol group comprising two of the four different symbols, and the first candidate symbol group and the second candidate symbol group including one identical symbol; The identical symbol is determined as the first bit of the encoded sequence.

A current bit of the encoded sequence is determined based on a current bit of the first binary code sequence, a current bit of the second binary code sequence, and a previous bit of the encoded sequence, the current bit of the encoded sequence being a bit other than the first bit of the encoded sequence. For example, a first candidate symbol group of a current bit of the encoded sequence is determined based on a current bit in the first binary code sequence according to a preset first mapping relationship, the first candidate symbol group comprising two of the four different symbols. A second candidate symbol group of the current bit of the encoded sequence is determined based on a current bit of the second binary code sequence, a previous bit of the encoded sequence according to a second predetermined mapping relationship, the second candidate symbol group comprising two of the four different symbols, and the first candidate symbol group and the second candidate symbol group including one identical symbol. The identical symbol is determined as the current bit of the encoded sequence.

In one embodiment, the first mapping relationship is a correspondence between the first bit or the current bit in the first binary code sequence and the symbols in the first candidate symbol group, wherein the symbols in the first candidate symbol group are two of A, C, G, T. The second mapping relationship is the correspondence between the first bit and the reference symbol in the second binary code sequence and the symbols in the second candidate symbol group, or the correspondence between the current bit and the previous bit in the second binary code sequence and the symbols in the second candidate symbol group, wherein the symbols in the second candidate symbol group are two of A, C, G, T.

In the above embodiment, with a previous bit in the encoded sequence as a constraint, the encoding method is designed to combine information of two different binary code sequences. The encoding method encodes two different binary code sequences into an encoded sequence composed of four different symbols, thereby improving storage density. In addition, the encoding method can be implemented with a plurality of joint encoding modes, in which the mapping relationship between binary codes and code symbols can be set flexibly, thereby avoiding the problem of a high rate of GC or AT repetitions in the encoded sequence.

Figure 9:
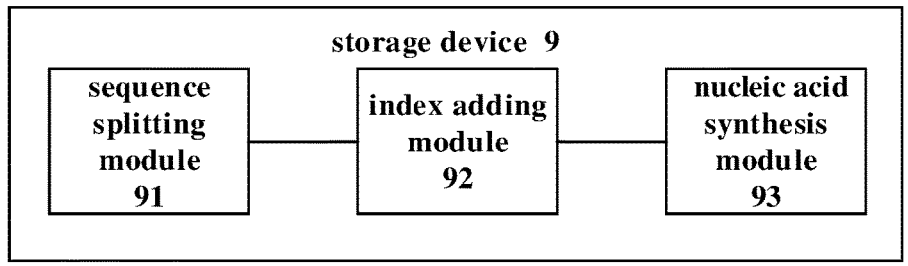
FIG. 9 shows a block diagram of a storage device according to some embodiments of the present disclosure.

FIG. 9 shows a block diagram of a storage device according to some embodiments of the present disclosure.

As shown in FIG. 9, the storage device 9 includes a sequence splitting module 91, an index adding module 92, and a nucleic acid synthesis module 93.

The sequence splitting module 91 is configured to split a nucleic acid sequence obtained in the above encoding method into a plurality of sequence fragments.

The index adding module is connected to the sequence splitting module and configured to add an index identifier to each sequence fragment, the index identifier containing position sequence information of the sequence fragment. For example, the index identifier may be a DNA sequence.

The nucleic acid synthesis module 93 is connected to the index adding module and configured to synthesize the sequence fragments into nucleic acid fragments.

Figure 10:
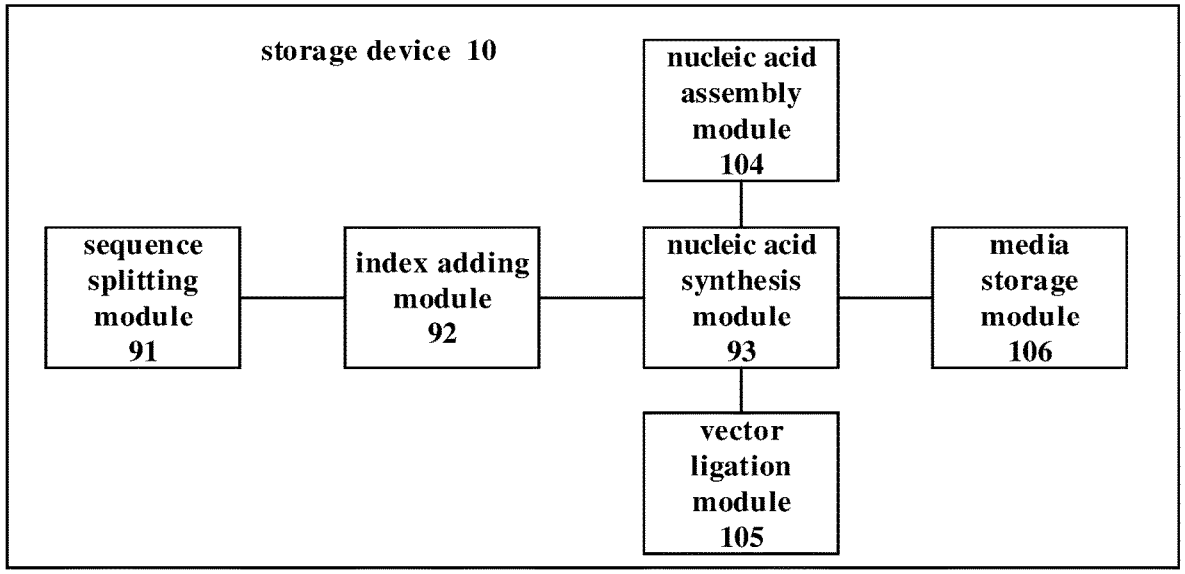
FIG. 10 shows a block diagram of a storage device according to other embodiments of the present disclosure.

FIG. 10 shows a block diagram of a storage device according to other embodiments of the present disclosure.

As shown in FIG. 10, the storage device 10 includes a sequence splitting module 91, an index adding module 92, a nucleic acid synthesis module 93, a nucleic acid assembly module 104, a vector ligation module 105, and a media storage module 106. The functions of the sequence splitting module 91, the index adding module 92, and the nucleic acid synthesizing module 93 are the same as those in the above embodiment, and will not be repeated herein.

The nucleic acid assembly module 104 is connected to the nucleic acid synthesis module 93 and is used to assemble the nucleic acid fragments.

The vector ligation module 105 is connected to the nucleic acid synthesis module 93 and is used to ligate the nucleic acid fragments with a vector.

The media storage module 106 is connected to the nucleic acid synthesis module 93 and is used to store the nucleic acid fragments in a medium, where the medium is a storage tube or a cell.

In the above embodiment, nucleic acid sequences are synthesized and stored as nucleic acid fragments, thereby improving the data retention time or storage density.

Figure 11:
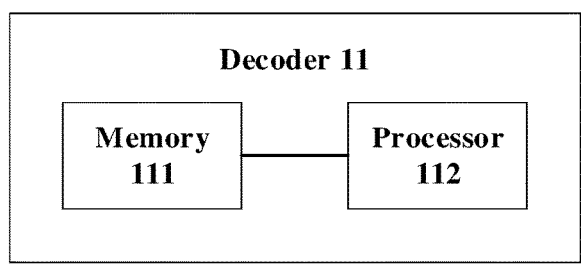
FIG. 11 shows a block diagram of a decoder of some embodiments of the present disclosure.

FIG. 11 shows a block diagram of a decoder of some embodiments of the present disclosure.

As shown in FIG. 11, the decoder 11 includes a memory 111 and a processor 112.

The memory 111 stores an encoded sequence generated by the above encoder.

The processor 112 is connected to the memory 111 and is configured to:

according to a first mapping relationship of the above encoder, decode two of the four different symbols included in an encoded sequence to 0, and decode the other two of the four different symbols to 1, to obtain a first binary code sequence.

A second binary code sequence can be obtained by the following steps.

A first bit of the second binary code sequence is determined based on a first bit of the encoded sequence and a reference symbol according to a second mapping relationship in above encoder, the reference symbol being any of the four different symbols.

A current bit of the second binary code sequence is determined based on a current bit and a previous bit of the encoded sequence according to the second mapping relationship in the above encoder, the current bit of the encoded sequence being a bit other than the first bit of the encoded sequence.

In some embodiments, the processor 112 obtains the encoded sequence by performing the following steps. Each nucleic acid fragment synthesized is sequenced according to the above storage method. Position information of each nucleic acid fragment is obtained according to an index identifier of each nucleic acid fragment. The nucleic acid fragments are assembled into an encoded sequence according to the position information.

In some embodiments, the processor 112 combines binary code sequences obtained by decoding into a binary code, and transcodes the binary code into corresponding information.

In the above embodiment, according to different mapping relationships, two different binary code sequences can be decoded from an encoded sequence composed of four different symbols, thereby improving the encoding storage density.

It shall be noted that: the above embodiments are merely illustration of the technical solution of this invention, but are not limitation thereof. Although this invention has been described in detail with preferred embodiments, those ordinary skilled in the art shall understand: embodiments of the present invention may be modified or some technical features thereof may be substituted equivalently, without departing from the spirit of the technical solution of this invention, all of which shall be encompassed in the scope of the technical solution as claimed in this invention.

What is claimed is:

1. An encoding method, comprising:

transcoding information to be encoded into a first binary code sequence and a second binary code sequence, using a processor;

encoding the first binary code sequence and the second binary code sequence, wherein the first and second binary code sequence have the same number of bits, into an encoded sequence of the information to be encoded, using the processor, the encoded sequence composed of multiple of four different kinds of symbols, wherein the four different kinds of symbols are four kinds of deoxyribonucleotides of adenine (A), cytosine (C), guanine (G), and thymine (T) and the encoded sequence is a nucleic acid sequence composed of the four kinds of deoxyribonucleotides;

splitting the nucleic acid sequence into a plurality of sequence fragments;

adding an index identifier to each of the plurality of sequence fragments, the index identifier of a corresponding sequence fragment comprising position information of the corresponding sequence fragment, wherein the index identifier of the corresponding sequence fragment is a DNA sequence; and synthesizing the sequence fragments into nucleic acid fragments as an encoding result, wherein the encoding comprises:

determining a current bit of the encoded sequence based on a current bit of the first binary code sequence, a current bit of the second binary code sequence, and a previous bit of the encoded sequence, the current bit of the encoded sequence being a bit other than a first bit of the encoded sequence;

wherein determining the current bit of the encoded sequence comprises:

determining a first candidate symbol group of the current bit of the encoded sequence based on the current first bit of the first binary code sequence according to a first mapping relationship, the first candidate symbol group comprising two of the four different kinds of symbols;

determining a second candidate symbol group of the current bit of the encoded sequence based on the current bit of the second binary code sequence and the previous bit of the encoded sequence according to a second mapping relationship, the second candidate symbol group comprising two of the four different kinds of symbols, wherein the first mapping relationship and the second mapping relationship are configured to ensure that the first candidate symbol group and the second candidate symbol group comprise one identical symbol; and determining the identical symbol as the current bit of the encoded sequence.

2. The encoding method according to claim 1, wherein the encoding comprises:

determining the first bit of the encoded sequence based on a first bit of the first binary code sequence, a first bit of the second binary code sequence, and a reference symbol, the reference symbol being any one of the four different kinds of symbols;

wherein the determining of the first bit of the encoded sequence comprises:

determining a first candidate symbol group of the first bit of the encoded sequence based on the first bit of the first binary code sequence according to a first mapping relationship, the first candidate symbol group comprising two of the four different kinds of symbols;

determining a second candidate symbol group of the first bit of the encoded sequence based on the first bit of the second binary code sequence and the reference symbol according to a second mapping relationship, the second candidate symbol group comprising two of the four different kinds of symbols, wherein the first mapping relationship and the second mapping relationship are configured to ensure that the first candidate symbol group and the second candidate symbol group comprise one identical symbol; and determining the identical symbol as the first bit of the encoded sequence.

3. The encoding method according to claim 2, wherein:

the first mapping relationship is a correspondence between the first bit or the current bit of the first binary code sequence and a symbol in the first candidate symbol group, the symbols in the first candidate symbol group comprising two of A, C, G, and T, the second mapping relationship is a correspondence between the first bit of the second binary code sequence, as well as the reference symbol, and a symbol of the second candidate symbol group, or a correspondence between the current bit and the previous bit of the second binary code sequence and a symbol of the second candidate symbol group, the symbols of the second candidate symbol group comprising two of A, C, G, and T.

4. The encoding method according to claim 1, further comprising:

transcoding the information to be encoded into a binary code; and extracting the first binary code sequence and the second binary code sequence from the binary code.

5. The encoding method according to claim 1, further comprising:

decoding the encoded sequence into the first binary code sequence and the second binary code sequence, wherein, the first binary code sequence is obtained by the following steps:

decoding two of the four different kinds of symbols comprised in the encoded sequence to 0 and the other two of the four different kinds of symbols to 1 according to the first mapping relationship to obtain the first binary code sequence; and wherein the second binary code sequence is obtained by the following steps:

determining a current bit of the second binary code sequence based on a current bit and a previous bit of the encoded sequence according to the second mapping relationship, the current bit of the encoded sequence being a bit other than the first bit of the encoded sequence.

6. The encoding method according to claim 5, wherein the encoded sequence is obtained by the following steps:

sequencing each nucleotide fragment to obtain the sequence fragments;

according to an index identifier of each sequence fragment, obtaining position information of each sequence fragment; and according to the position information, assembling the sequence fragments into the encoded sequence.

7. The encoding method according to claim 5, further comprising:

combining the binary code sequences obtained by decoding into a binary code; and transcoding the binary code into corresponding information.

* * * * *